(12) United States Patent     (10) Patent No.: US 7,453,341 B1
Hildenbrand     (45) Date of Patent: Nov. 18, 2008

(54) SYSTEM AND METHOD FOR UTILIZING MAGNETIC ENERGY

(76) Inventor: Jack W. Hildenbrand, 2438 Russ Rd., Jackson, OH (US) 45640

( * ) Notice: Subject to any disclaimer, the term of this patent is extended or adjusted under 35 U.S.C. 154(b) by 0 days.

(21) Appl. No.: 11/177,604

(22) Filed: Jul. 8, 2005

Related U.S. Application Data

(63) Continuation-in-part of application No. 11/015,058, filed on Dec. 17, 2004, now abandoned, and a continuation-in-part of application No. 11/015,560, filed on Dec. 17, 2004.

(51) Int. Cl.
    *H01F 7/08* (2006.01)
(52) U.S. Cl. ............... 335/272; 310/46; 310/154.01; 310/154.02; 310/181
(58) Field of Classification Search ........... 335/225, 335/229–234, 272; 310/46–46 R, 48, 154.02, 310/155, 168, 181, 154.01, 254; 336/110
See application file for complete search history.

(56) References Cited

U.S. PATENT DOCUMENTS

| | | | | |
|---|---|---|---|---|
| 4,132,911 | A * | 1/1979 | Garron | 310/46 |
| 6,246,561 | B1 | 6/2001 | Flynn | 361/147 |
| 6,342,746 | B1 * | 1/2002 | Flynn | 310/181 |

OTHER PUBLICATIONS

Flynn Research, webpages from http://www.flynnresearch.net, no date.

Brush DC Motors by Servo Magnetics Incorporated, webpages from http://www.servomag.com/brush_motors.html, no date.

Jones, D., Part of Stepping Motors, The University of Iowa Department of Computer Sciences, webpages from http://www.cs.uiowa.edu/~jones/step/circuits.html, no date.

Jason's Home Page: Electronic Design & Prototyping Pages: Working with Stepper Motors, webpages from: http://www.eio.com/jas-step.htm, no date.

Bunting Magnetics Co.-Home, webpage from http://www.bunting-magnetics.com/, no date.

Bunting Magnetics Co., Lifters for thin Gauge Stock/Maglift TG, Webpages from http://www.bunting-magnetics.com/mag-lift-thin.cfm, no date.

(Continued)

*Primary Examiner*—Ramon M Barrera
(74) *Attorney, Agent, or Firm*—Standley Law Group LLP

(57) ABSTRACT

The present invention is a system and method for utilizing magnetic energy. The basic principles of the present invention may be implemented in a variety of systems and methods. A magnet may be rotated or an electromagnet may be controlled in order to control a magnetic field generated by a set of magnets. As a result, numerous, substantial benefits may be achieved by providing at least one set of multiple magnets. For example, the present invention may be used in systems and methods to perform a variety of functions including, but not limited to: (1) to control, manipulate, hold, and/or release a load; (2) to open and/or close a pathway; (3) to open and/or close a circuit; (4) to apply a magnetic field to a load and/or to remove a magnetic field from a load; (5) to intermittently apply and remove a magnetic field; (6) to increase the magnetic field that may be applied to a load; (7) to induce a load into motion; (8) to create energy; and (9) to improve the energy efficiency of a device or system.

27 Claims, 14 Drawing Sheets

OTHER PUBLICATIONS

Bunting Magnetics Co., Electro Magnetic Lifters / Round Lifting Magnets, Webpages from http://www.bunting-magnetics.com/mag-lift-electro.cfm, no date.

Bunting Magnetics Co., Remote-Controlled Permanent Magnetic Lifters, Webpages from http://www.bunting-magnetics.com/mag-lift-remote.cfm, no date.

Bunting Magnetics Co., MagLift Hand-Controlled Magnetic Lifters, Webpages from http://www.bunting-magnetics.com/mag-lift-hand.cfm, no date.

Bunting Magnetics Co., MagLift Magnetic Lifters, Webpages from http://www.bunting-magnetics.com/mag-lift-200.cfm, no date.

Bunting Magnetics Co., Permanent Magnetic Lifters, Webpages from http://www.bunting-magnetics.com/mag-lift.cfm, no date.

* cited by examiner

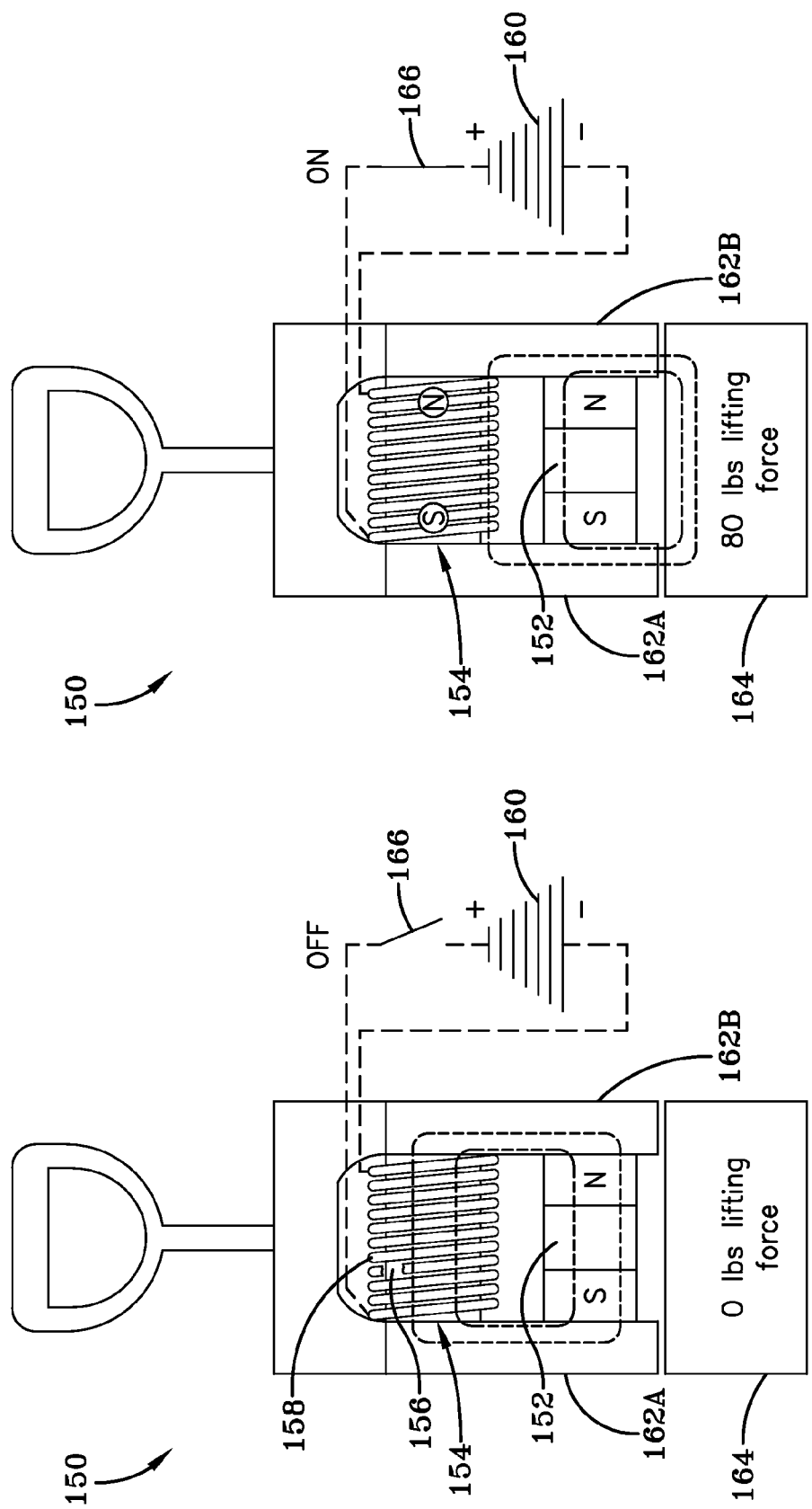

SYSTEM AND METHOD FOR UTILIZING MAGNETIC ENERGY

This is a continuation-in-part of U.S. application Ser. No. 11/015,058, filed Dec. 17, 2004 now abandoned. This is also a continuation-in-part of U.S. application Ser. No. 11/015,560, filed Dec. 17, 2004. The entirety of each of the above priority documents is incorporated herein by reference.

BACKGROUND AND SUMMARY OF THE INVENTION

The present invention relates generally to systems and methods for utilizing magnetic energy. Utilizing the principles of the present invention, various systems and methods for utilizing magnetic energy may be developed. Examples of the present invention include a valve (e.g., a holding or lifting device), a motor, a generator, and other similar or suitable systems and methods.

In general, a magnet is an object that produces a flux field as a result of the effects of molecular alignment or because of the effects of electric current. A traditional use of magnets is for holding metallic objects. In a traditional use of a magnet, a sufficient amount of physical force must be applied in order to release an object (i.e., a load) from the magnet. The difficulty of releasing the object from the magnet increases as the magnetic power increases. Thus, depending on the power of the magnet, an individual may have difficulty prying the object from the magnet. Also, the force required to remove the object may inadvertently cause damage to the object.

As briefly mentioned above, one type of a magnet is an electromagnet, which may be used similarly to a traditional, permanent magnet. An example of an electromagnet may be formed by coiling an electric conductor around a metal rod. An electromagnetic field is produced by conducting a current through the coil, and the electromagnetic field may be turned off by removing power to the coil. In this manner, an electromagnet may release an object that it was holding.

Although various uses of magnets have been made, a need exists for an improved system and method for applying as well as releasing magnetic power. For example, a need exists for a system for increasing the magnetic field that may be applied to a load. A need also exists for increasing magnetic power without a corresponding increase in the force or energy required to remove the magnetic field from a load. Furthermore, a need exists for a system and method for using magnetic energy to produce various forms of energy including, but not limited to, kinetic energy (e.g., rotational motion, linear motion, and other types of motion), mechanical energy, electrical energy, and/or other forms of energy. Some exemplary embodiments of the present invention may satisfy one or more of the aforementioned needs.

One exemplary embodiment of the present invention is a device comprising a plurality of magnets. At least one magnet is moveable with respect to at least one other magnet such that the poles of the magnets may be moved into and/or out of alignment. By moving the poles of the magnets into alignment, a magnetic field generated by the magnets is adapted to be applied to a load, and the magnetic field is adapted to be substantially removed from the load by moving the poles of the magnets out of alignment.

Another exemplary embodiment of the present invention is also a device comprising a plurality of magnets. However, in this embodiment, at least one of the magnets is an electromagnet. In this example, a magnetic field generated by the magnets is adapted to be applied to and substantially removed from a load by controlling a flow of current to at least one electromagnet.

Still another embodiment of the present invention is a method for utilizing magnetic energy. A plurality of magnets is provided in the method. The method involves switching a magnetic field generated by the magnets.

The exemplary embodiments of the present invention may be embodied in a variety of systems. For example, by redirecting or switching a magnetic field that is generated by magnets, the present invention may be used to perform a variety of functions including, but not limited to: (1) to control, manipulate, hold, and/or release a load; (2) to open and/or close a pathway; (3) to open and/or close a circuit; (4) to apply a magnetic field to a load and/or to remove a magnetic field from a load; (5) to intermittently apply and remove a magnetic field; (6) to increase the magnetic field that may be applied to a load; (7) to induce a load into motion; (8) to create energy; and (9) to improve the energy efficiency of a device or system.

In addition to the novel features and advantages mentioned above, other features and advantages of the present invention will be readily apparent from the following descriptions of the drawings and exemplary embodiments.

BRIEF DESCRIPTION OF THE DRAWINGS

FIG. 6 is a schematic, cross-sectional diagram of a third exemplary embodiment of a valve of the present invention.

FIG. 7 is a schematic, cross-sectional diagram of the valve of FIG. 6 with a flow of current applied to the electromagnet.

DETAILED DESCRIPTION OF EXEMPLARY EMBODIMENT(S)

Figure 1:
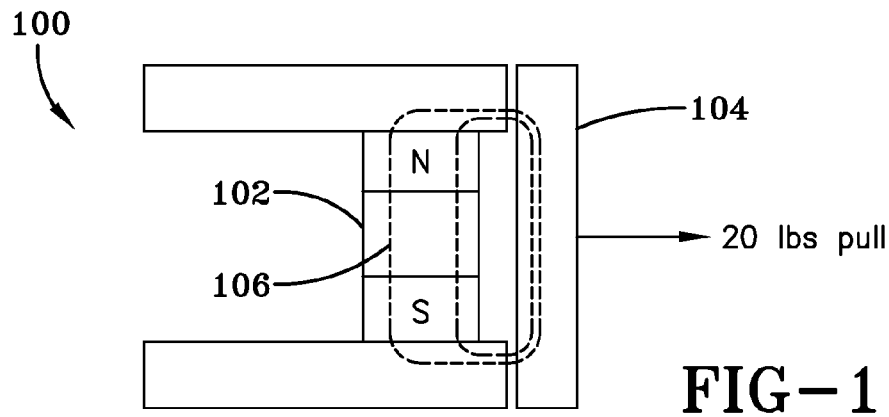
FIG. 1 is a schematic, cross-sectional diagram of a magnetic device.

The present invention is directed to systems and methods for utilizing magnetic energy. Indeed, the basic principles of the present invention may be implemented in a variety of systems and methods. The inventor has surprisingly discovered that numerous, substantial benefits may be achieved by providing at least one set of multiple magnets. For example, the present invention may be used in systems and methods to perform a variety of functions including, but not limited to: (1) to control, manipulate, hold, and/or release a load; (2) to open and/or close a pathway; (3) to open and/or close a circuit; (4) to apply a magnetic field to a load and/or to remove a magnetic field from a load; (5) to intermittently apply and remove a magnetic field; (6) to increase the magnetic field that may be applied to a load; (7) to induce a load into motion; (8) to create energy; and (9) to improve the energy efficiency of a device or system. Based on the present application, it is apparent that other benefits are possible and included within the scope of the present invention. Although many benefits are possible, the present invention is not limited to providing any particular benefits, unless expressly stated otherwise in the claims.

In one exemplary embodiment of the present invention, at least one of the magnets in a set may be moved (e.g., rotated) in order to control the magnetic pull. In order words, the path of the magnetic field may be redirected (i.e., switched), essentially enabling the magnetic pull with respect to another object (i.e., a load) to be changed as desired. For example, the magnetic flux through a load may be turned on and off as desired (e.g., in a predetermined sequence). Nevertheless, it should be recognized that the level of magnetic flux through a load may simply be varied in some embodiments of the invention.

In another exemplary embodiment, similar results may be achieved by providing at least one electromagnet in each set of magnets. By controlling the flow of current through the coil(s) of the electromagnet(s), the path of the magnetic field may be redirected. For example, the power to the electromagnet may be changed (e.g., varied and/or turned on and off) in order to change or redirect the path of the magnetic field. In this manner, the magnetic pull of the set of magnets may be changed with respect to a load. For example, the magnetic flux through a load may be turned on and off as desired (e.g., in a predetermined sequence), or the level of magnetic flux through a load may simply be varied as desired.

The inventor has surprisingly discovered that a variety of systems and methods may implement some or all of the aforementioned principles in order to utilize the substantial benefit of magnetic energy. For example, the inventor has developed a valve (e.g., a holding/lifting device), a motor, and a generator using the concepts of the present invention. It should be recognized that other systems and methods are possible and too numerous to mention. Therefore, it is not intended to limit the scope of the invention to the specific exemplary embodiments discussed herein.

FIG. 1 illustrates an example of a magnetic device. The device 100 is comprised of magnet 102. In this example, the magnet 102 exhibits 20 lbs. of pull on load 104. The lines of magnetic flux 106 are shown merely for illustrative purposes. The magnetic pull cannot be turned off in this embodiment. As a result, physical force must be used to overcome the magnetic pull and release the load 104.

Figure 2:
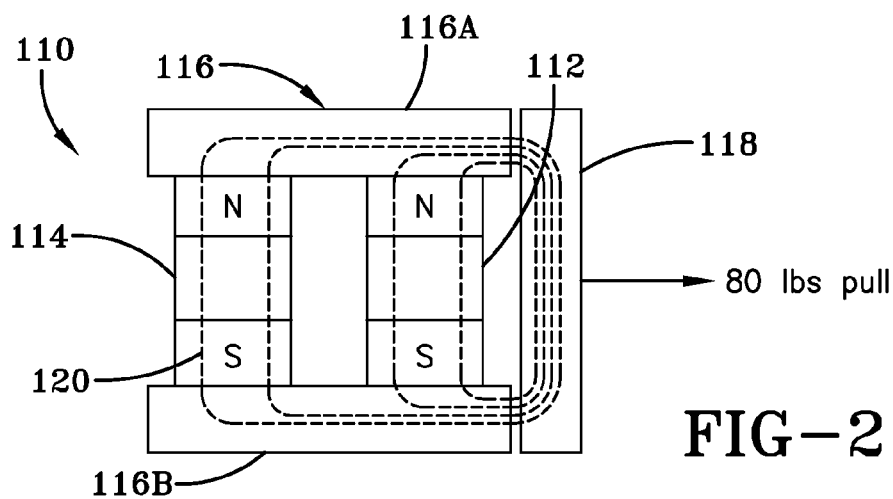
FIG. 2 is a schematic, cross-sectional diagram of a first exemplary embodiment of a valve of the present invention.
Figure 3:
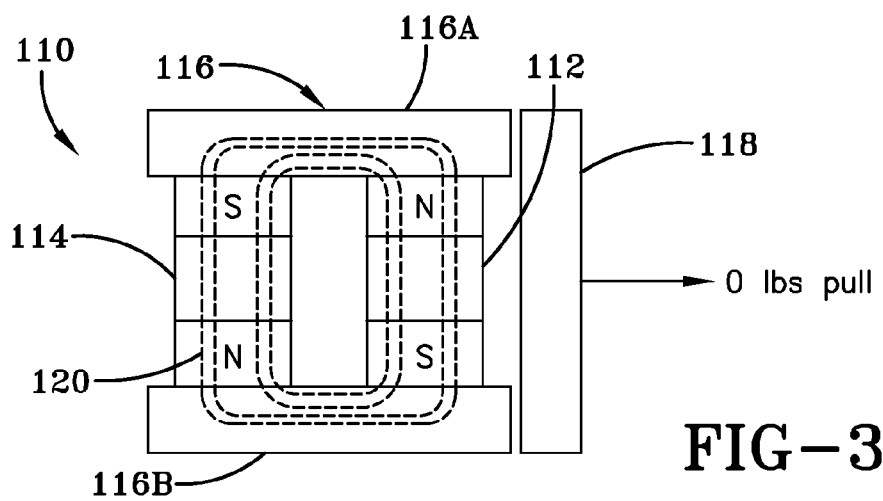
FIG. 3 is a schematic, cross-sectional diagram of the valve of FIG. 2 with one of the magnets rotated 180 degrees.

FIGS. 2 and 3 show an exemplary embodiment of the present invention. The device 110 is an example of a valve for controlling a magnetic field. In this embodiment, the device 110 is comprised of a set of magnets, namely magnet 112 and magnet 114. Simply for the purpose of the explaining the concept of the present invention, each individual magnet in this example produces 20 lbs of pull. In fact, in some exemplary embodiments of the invention, it is preferred that the magnets are substantially evenly matched. In other words, each of the magnets is of substantially the same grade or is capable of producing substantially the same energy product. For instance, the use of substantially evenly matched magnets may facilitate the redirection of the magnetic field away from the load 118 such as shown in FIG. 3. It may also increase the efficiency of the device. However, in other embodiments of the present invention, it must be recognized that the magnets do not have to produce equal magnetic pull. The magnets in each set may produce different levels of magnetic pull in some embodiments of the present invention. Moreover, the magnetic pull of each magnet may be more or less than 20 lbs. and may be selected in order to meet the demands of the intended use of the device. The magnets may be permanently mounted or otherwise situated (e.g., in a permanent or removable manner) in a device body 116. In particular, at least one of the magnets is rotatably mounted or otherwise moveable in the device body 116. As a result, at least one of the magnets is moveable with respect to the other magnet. For example, magnet 112 may be fixed in position, and magnet 114 may be rotatably mounted in the device body 116. When the poles of the magnets are aligned such as shown in FIG. 2, the magnetic pull of the device 110 is maximized such that there is 80 lbs. of pull on the load 118. The lines of magnetic flux 120 are illustrated simply to assist in the description of the present invention. By rotating or otherwise moving magnet 114 such that the poles are out of alignment such as shown in FIG. 3, the path of the magnetic field is redirected (i.e., switched) such that it loops between magnet 112 and magnet 114. As a result, the magnetic pull on load 118 in FIG. 3 is turned off, thereby releasing load 118 from device 110 without having to apply physical force to it. Such an embodiment of the present invention enables the magnetic pull of each magnet to be maximized when needed, and the object 118 may be easily released from the device 110 when it is no longer desired to hold or lift object 118 with device 110.

In the example shown in FIGS. 2 and 3, the device body 116 is comprised of a pair of field poles 116A and 116B. Magnets 112 and 114 are in magnetic communication with field poles 116A and 116B. As used herein, magnetic communication means that lines of magnetic flux are capable of passing from a magnet to a field pole. Field poles 116A and 116B are comprised of a magnetic material, which includes, but is not limited to, iron, nickel, and other magnetic materials. Examples of iron include steel and electrical iron. It is preferred that the field poles do not magnetically saturate when subjected to the magnetic flux generated by magnets 112 and 114. Such an embodiment facilitates the redirection of the magnetic field away from the load 118 such as shown in FIG. 3. Nevertheless, it should be recognized that at least one field pole may magnetically saturate when subjected to the magnetic field generated by the magnets in some embodiments of the present invention.

The device body 116 may substantially enclose or surround magnets 112 and 114 in some exemplary embodiments of the present invention. For example, field poles 116A and 116B may be connected by non-magnetic material, thereby forming an enclosure or chassis for magnets 112 and 114. Examples of non-magnetic material include, but are not limited to, aluminum and other similar materials.

Magnets 112 and 114 are examples of permanent magnets. The type of magnets may be selected in order to achieve the desired magnetic properties. For example, the magnets may be rare earth magnets. Examples of rare earth magnets include, but are not limited to, magnets comprised of alloys of the Lanthanide group of elements and other similar materials. Two Lanthanide elements that are used in the production of permanent magnets are Neodymium and Samarium. For example, Neodymium-Iron-Boron (NdFeB) and Samarium Cobalt (SmCo) are examples of rare earth magnets. Rare earth magnets may be used in any suitable form including, but not limited to, sintered and bonded forms. In general, bonded magnets may be more durable, but the energy product of bonded magnets may be lower than that of sintered magnets. The magnets may be plated or coated with a material to prevent corrosion, if desired. There are various coatings available including, but not limited to, Nickel-Copper-Nickel plating and other similar types of plating. For example, Nickel-Copper-Nickel plating may be useful for increasing corrosion resistance and durability and providing a clean and shiny appearance.

Figures 4, 5:
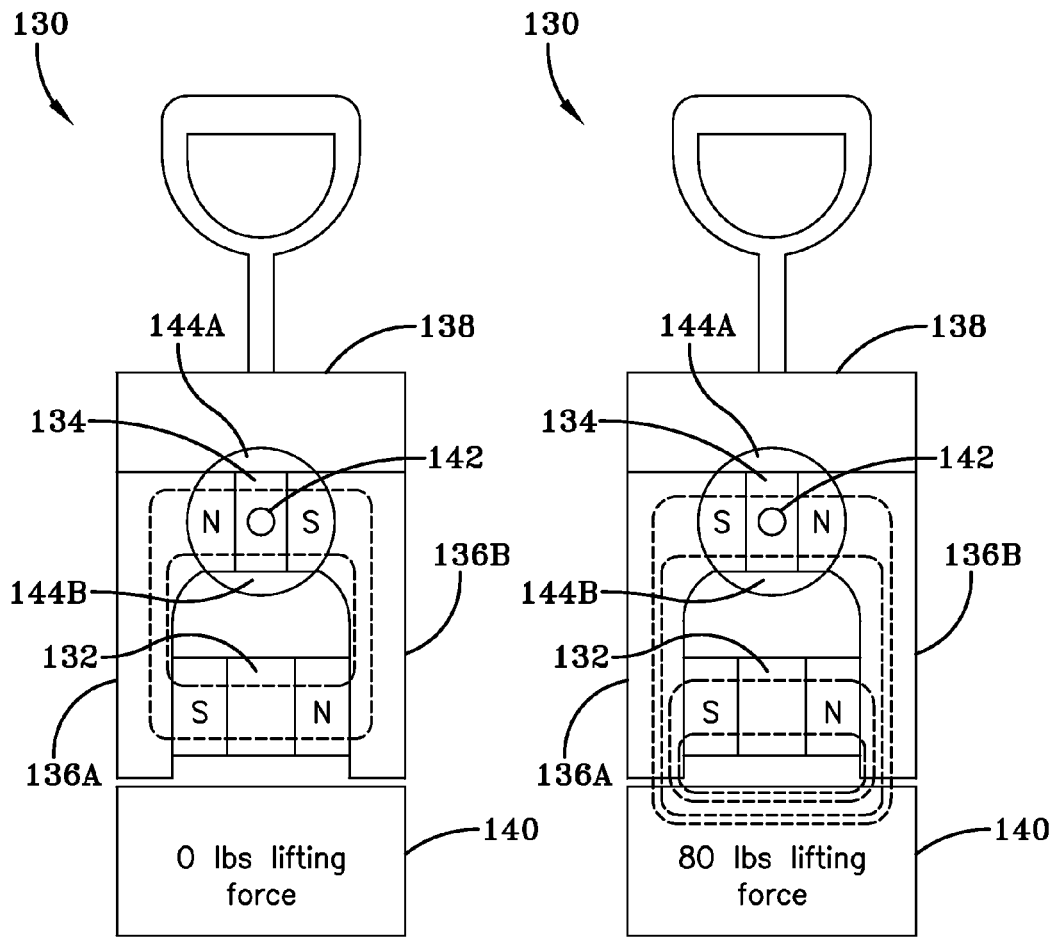
FIG. 4 is a schematic, cross-sectional diagram of a second exemplary embodiment of a valve of the present invention in a release position.
FIG. 5 is a schematic, cross-sectional diagram of the valve of FIG. 4 in a holding position.
Figure 8:
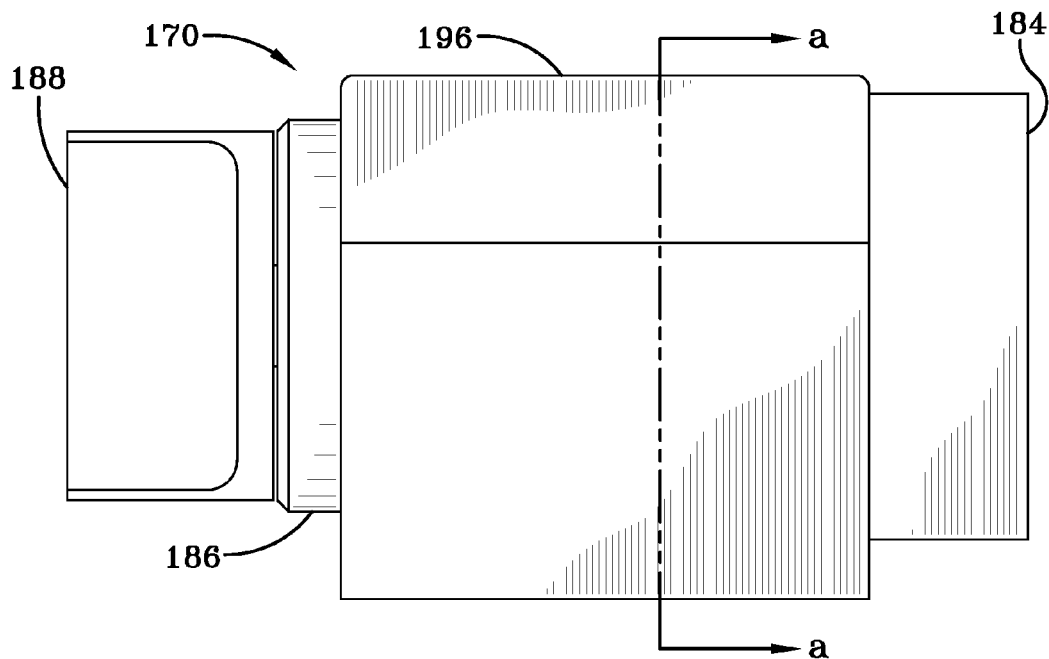
FIG. 8 is a side elevation view of an exemplary embodiment of a magnetic indicator stand of the present invention.

FIGS. 4 and 5 illustrate another embodiment of a valve of the present invention. In this embodiment, the device 130 may be substantially similar to device 110, which is described above. In this example, the device 130 is comprised of fixed permanent magnet 132 and rotatable permanent magnet 134. In particular, magnet 134 is rotatably situated between field pole 136A and 136B. As a result, the respective poles of magnet 132 and magnet 134 may be reversed with respect to each other such as shown in FIG. 4, and the respective poles of magnet 132 and magnet 134 may also be aligned such as shown in FIG. 5. Referring to the position shown in FIG. 4, the magnetic field may be isolated between magnets 132 and 134 such as described above. However, in FIG. 5, the magnetic filed is switched to a load 140 by rotating magnet 134. Thus, holding block 138 may be used to lift load 140, assuming the load 140 does not exceed the lifting force of device 130. The holding block 138 may be comprised of a non-magnetic material to limit its effect on the magnetic field.

The magnet 134 may be rotatably situated between field poles 136A and 136B in any suitable manner. For example, the magnet 134 may be connected to a rotatable shaft 142, which may be connected to the body of device 130. The shaft 142 may be manually or automatically controlled to rotate magnet 134.

Such as shown in FIGS. 4 and 5, portions of magnet 134 may be capped with non-magnetic material 144A and 144B. The non-magnetic material may be positioned to limit undesired transfer of lines of magnetic flux. In this example, the non-magnetic material facilitates the isolation of the lines of magnetic flux in the desired path.

FIGS. 6 and 7 show yet another embodiment of the present invention. In this example, the valve 150 is comprised of at least one electromagnet. In particular, the valve 150 of this embodiment is comprised of a permanent magnet 152 and an electromagnet 154. However, in other embodiments, permanent magnet 152 may be replaced with another electromagnet. The electromagnet is comprised of a core 156 and a coil 158. The core 156 may be comprised of a magnetic material including, but not limited to, iron and other magnetic materials, and the coil 158 may be comprised of an electrically conductive material including, but not limited to, copper and other electrically conductive materials. The coil 158 may be in electrical communication with a power source 160. The power source 160 may be a direct current (DC) power source or an alternating current (AC) power source. In an exemplary embodiment of the present invention, the electromagnet 154 and the power source 160 may be selected such that the magnet 152 and electromagnet 154 have substantially equal magnetic power when the electromagnet produces a magnetic field.

The valve 150 may be substantially similar to the aforementioned embodiments of the present invention. Similar to the previous embodiments, magnets 152 and 154 are in magnetic communication with field poles 162A and 162B. However, instead of moving (e.g., rotating) a magnet in order to control a magnetic field, a flow of current to the electromagnet 154 may be used to control a magnetic field generated by magnets 152 and 154. For example, a flow of direct current may be applied to electromagnet 154 in order to direct the magnetic field generated by magnets 152 and 154 through the load 164. In other words, the magnetic field generated by magnets 152 and 154 is forced to go outside of field poles 162A and 162B, creating a force on load 164. In this state such as shown in FIG. 7, the poles of magnets 152 and 154 are aligned, and the valve 150 may be considered to be in an on position. The example of FIG. 7 indicates 80 lbs. of lifting force assuming that each magnet is individually capable of producing 20 lbs. of lifting force. The flow of direct current may be turned off in order to remove the magnetic field from the load 164. By turning off the flow of direct current, the magnetic field generated by magnet 152 may be redirected away from load 164 to a path between magnets 152 and 154. In other words, the magnetic field created by magnet 152 may be shorted out through core 156 of magnet 154 such that the magnetic field is contained between magnets 152 and 154 and field poles 162A and 162B. In this state, the valve 150 may be considered off such as shown in FIG. 6. As noted earlier with regard to other embodiments, substantial removal of the magnetic field from load 164 may be facilitated by using field poles that are comprised of material that does not magnetically saturate when subjected to the magnetic field. A switch 166 may be used to control the power to the electromagnet 154. The switch may manually or automatically control the power to the electromagnet 154. For example, the switch may be an electronic switch or any other suitable programmed device that automatically controls the power to the electromagnet 154. In an alternative embodiment, the power source may provide a flow of alternating current to the electromagnet. In such an embodiment, the combined magnetic field of the magnets may be directed through the load every positive half-cycle of alternating current. During the negative half-cycle of alternating current, the magnetic field may be removed from the load in exemplary embodiments of the invention.

As described above, a magnetic field may be switched by rotating a magnet and/or by controlling a flow of current to an electromagnet. In exemplary embodiments of the present invention, the lines of magnetic flux may be switched back and forth between a path that is isolated between magnets and a path that goes through a load. Such embodiments may be facilitated by using magnets that are substantially evenly matched and field poles that will not magnetically saturate. The switching of the magnetic field may be intermittent. For example, the switching may occur in a predetermined cycle. Switching the magnetic field in a predetermined cycle (e.g., a regular cycle) may be useful for inducing and sustaining rotation of a rotatable load.

FIGS. 8-13 show an example of an implementation of a valve of the present invention. In this example, the magnetic indicator stand 170 is comprised of multiple valves of the present invention. In other words, magnetic indicator stand 170 is comprised of a valve that includes multiple sets of magnets that utilize the same field poles. In particular, this exemplary embodiment of the magnetic indicator stand 170 is comprised of four sets of magnets that use the same field poles. Nevertheless, it should be recognized that a specific implementation of the present invention may include any desired number of sets of magnets. Moreover, the sets of magnets used in a specific implementation may be similar or dissimilar (e.g., each set of magnets may be adapted to provide a different magnetic field). It should also be recognized that some exemplary embodiments of the present invention may include multiple valves, wherein each valve utilizes a different set of field poles.

Figure 9:
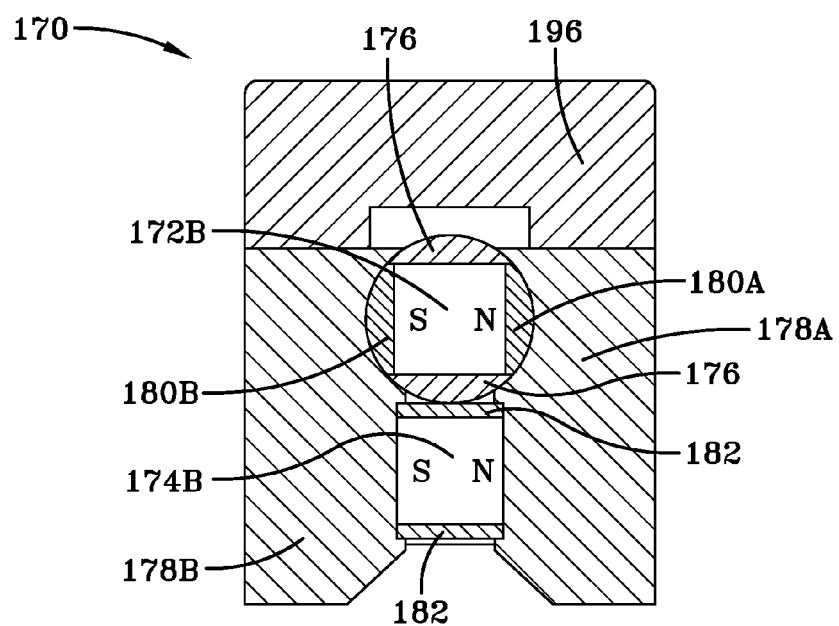
FIG. 9 is a cross-sectional view of the magnetic indicator stand of FIG. 8 taken along the line a-a.
Figure 10:
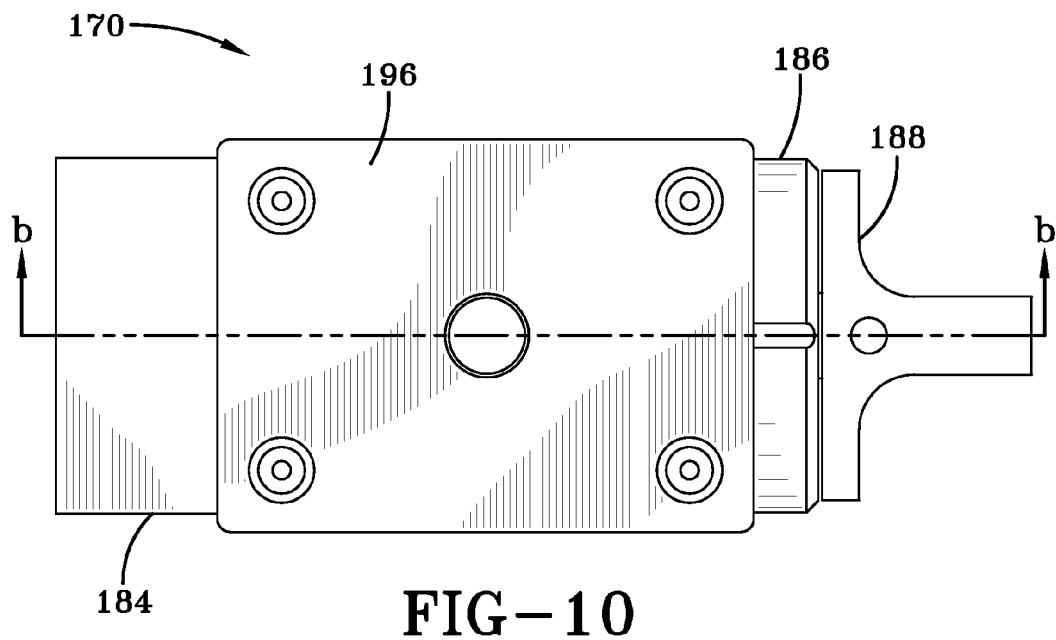
FIG. 10 is a top plan view of the magnetic indicator stand of FIG. 8.

FIG. 9 shows one valve of the magnetic indicator stand 170. The valve is comprised of a rotatable magnet 172B and a second magnet 174B, which may be stationary (i.e., fixed). The rotatable magnet may be situated in or otherwise connected to a rotor 176. In this example, the rotor may be comprised of a non-magnetic material including, but not limited to, aluminum. The non-magnetic material may limit undesired transfer of a magnetic field. Nevertheless, it should be recognized that some implementations of the present invention may use a rotor comprised of magnetic material. Magnets 172B and 174B are in magnetic communication with field poles 178A and 178B. Field poles 178A and 178B are comprised of a magnetic material (e.g., iron that will not magnetically saturate under the magnetic lines of flux generated by magnets 172B and 174B). Magnet 172B may be capped with magnetic material (e.g., iron, nickel, or any other suitable magnetic material). In the example of FIG. 9, magnet 172B includes caps 180A and 180B. Caps 180A and 180B may facilitate or simply improve magnetic communication with field poles 178A and 178B. In addition, caps 180A and 180B may serve to round off rotor 176. For example, caps 180A and 180B may be machined to the desired shape. Magnet 174B may be capped with or situated adjacent to or within a block 182 of non-magnetic material such as aluminum. In this example, block 182 may be used to help to direct the lines of magnetic flux to pass through field poles 178A and 178B. For example, block 182 may be used to prevent lines of magnetic flux from passing directly from magnet 172B to magnet 174B, particularly during rotation of magnet 172B.

Figure 11:
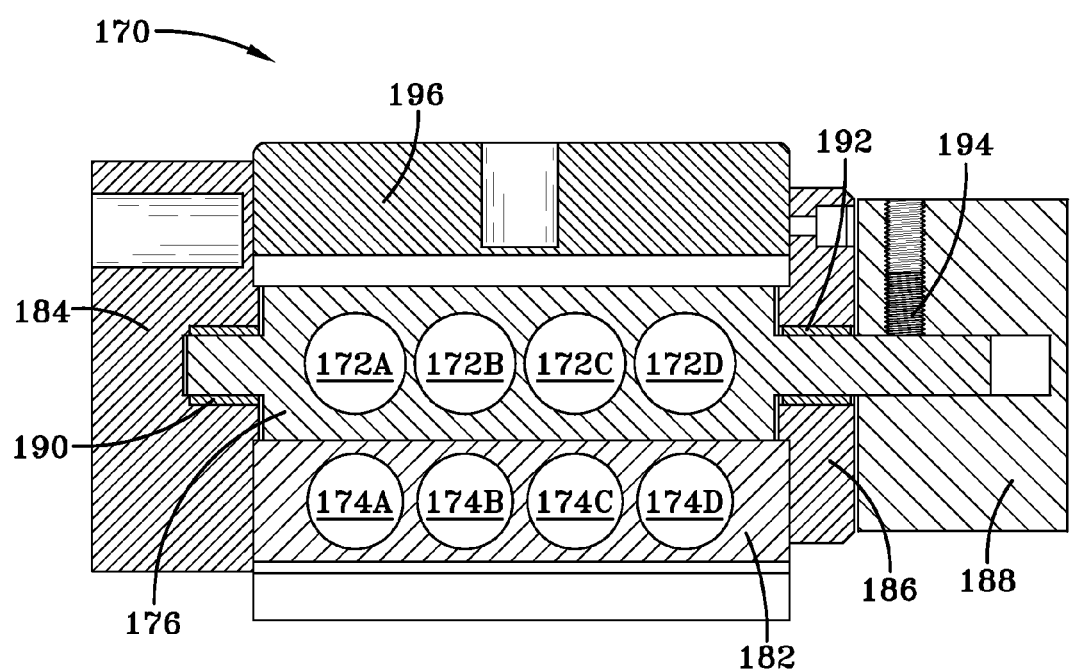
FIG. 11 is a cross-sectional view of the magnetic indicator stand taken along the line b-b of FIG. 10.
Figure 12:
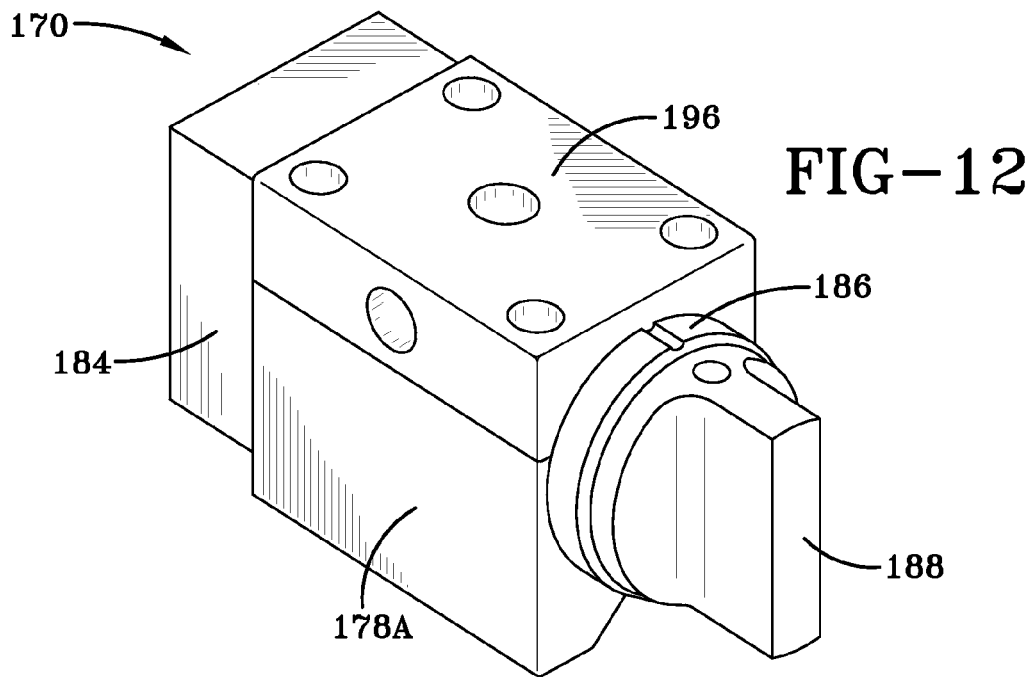
FIG. 12 is a first perspective view of the magnetic indicator stand of FIG. 8.
Figure 13:
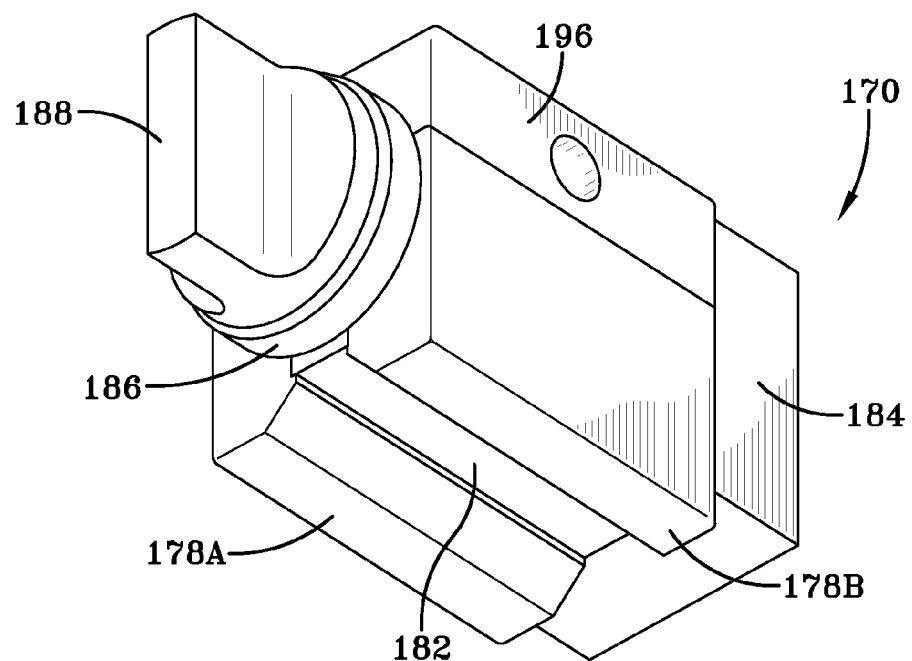
FIG. 13 is a second perspective view of the magnetic indicator stand of FIG. 8.

FIG. 11 illustrates the four valves of this exemplary embodiment. In particular, FIG. 11 shows a first valve comprised of magnets 172A and 174A, a second valve comprised of magnets 172B and 174B, a third valve comprised of magnets 172C and 174C, and a fourth valve comprised of magnets 172D and 174D. Magnets 172A, 172B, 172C, and 172D are each situated in rotor 176. In other exemplary embodiments of the present invention, each valve may be individually rotatable. In this example, rotor 176 is rotatably situated between an end cap 184 and knob cap 186 and knob 188. End cap 184, knob cap 186, and knob 188 are preferably comprised of a non-magnetic material such as aluminum. However, in alternative embodiments of the invention, such components may be comprised of magnetic material. Bushing 190 may be used to facilitate a rotatable connection with end cap 184, and bushing 192 may be used to facilitate a rotatable connection with knob cap 186 and knob 188. In this example, the bushings may be comprised of stainless steel or another suitable material. Knob 188 may be used to rotate rotor 176, thereby enabling the switching of the magnetic field generated by each valve. Optionally, a set screw 194 may be used to secure knob 188 to rotor 176. A top cap 196 may also be included. The top cap 196 may be comprised of non-magnetic material such as aluminum for limiting the undesired transfer of magnetic flux. However, it should be recognized that a top cap of alternative embodiments of the present invention may be comprised of a magnetic material.

The aforementioned example illustrates a valve comprised of four sets of magnets situated between a pair of field poles (i.e., four valves), wherein each set of magnets is comprised of two magnets. However, a valve of the present invention is not limited to being comprised of at least one set of two magnets. In some exemplary embodiments of the present invention, a valve may include at least one set of three or more magnets. For example, in such embodiments of the present invention, at least one of the magnets in a set may be rotatable and/or at least one of the magnets may be an electromagnet.

In addition to simply applying a magnetic field to a load, an exemplary embodiment of the present invention may be used to induce a load into motion, thereby creating energy. For example, a motor of the present invention may be comprised of at least one valve such as described above. By switching or redirecting the magnetic field generated by each valve, at least one rotor may be induced into motion (e.g., rotated). As a result, an exemplary embodiment of a motor of the present invention may be used to provide power.

Figure 14A:
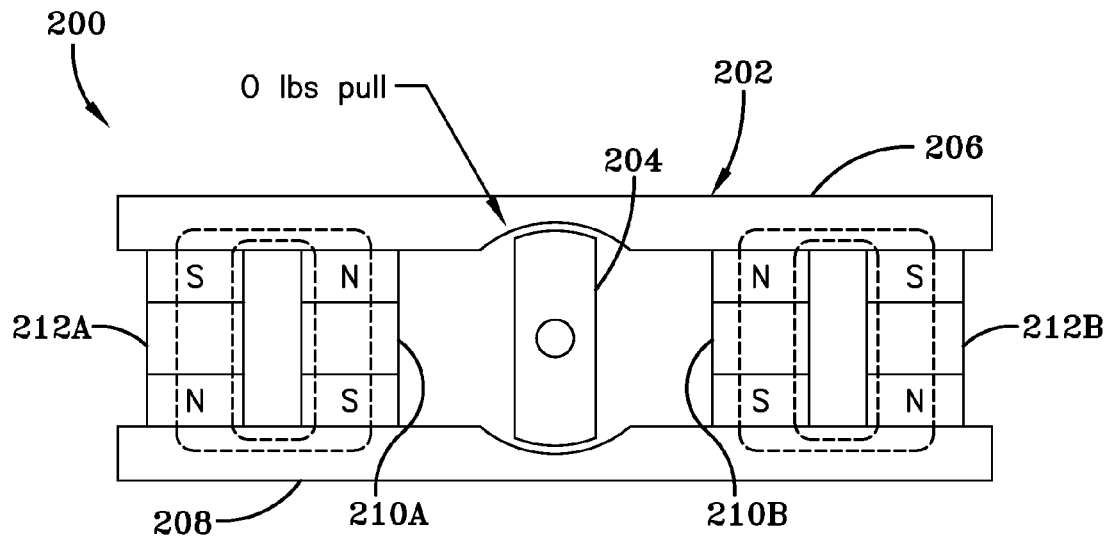
FIG. 14A is a schematic, cross-sectional view of an exemplary embodiment of a motor of the present invention.
Figure 14B:
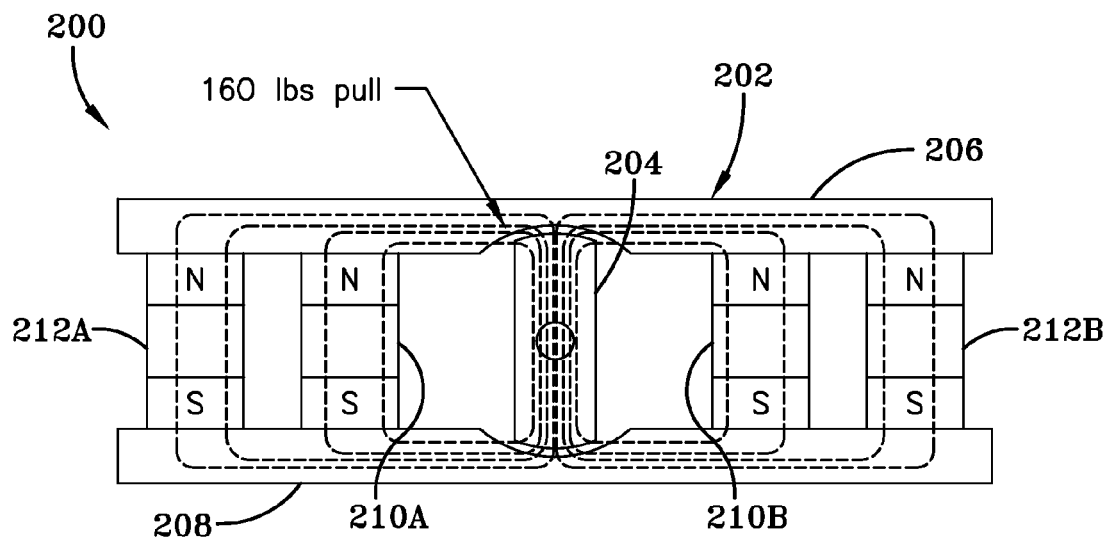
FIG. 14B is a schematic, cross-sectional view of the motor of FIG. 14A with the magnetic field directed through the rotor.

FIG. 14A and FIG. 14B show one example of a motor of the present invention. In this exemplary embodiment, motor 200 is comprised of a valve 202 and a rotor 204. In this example, valve 202 is comprised of field poles 206 and 208. In addition, valve 202 includes two sets of magnets: namely, a first set of magnets comprising magnets 210A and 212A, and a second set of magnets comprising magnets 210B and 212B. Each of the magnets is situated between field poles 206 and 208. More particularly, magnets 212A and 212B are rotatably or otherwise moveably situated between field poles 206 and 208. In addition, such as shown in this example, rotor 204 may also be rotatably situated between field poles 206 and 208. In FIG. 14A, magnets 212A and 212B are situated such that there is substantially no magnetic pull on rotor 204 (i.e., the magnetic field of each set of magnets is substantially isolated to a path flowing between the magnets). However, in FIG. 14B, magnets 212A and 212B have been rotated such that the poles of the magnets are aligned. Assuming that each of the magnets in this example is individually capable of creating 20 lbs. of magnetic pull, the resulting pull on rotor 204 is 160 lbs. in FIG. 14B. As a result, by intermittently rotating magnets 212A and 212B, the intermittent magnetic pull on rotor 204 may induce as well as sustain the rotation of rotor 204.

Figure 15A:
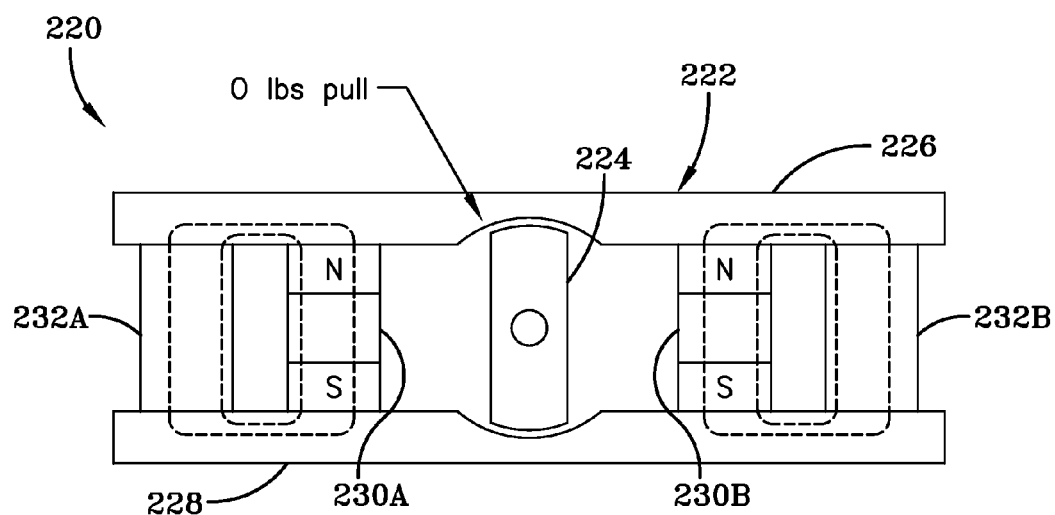
FIG. 15A is a schematic, cross-sectional view of a second exemplary embodiment of a motor of the present invention.
Figure 15B:
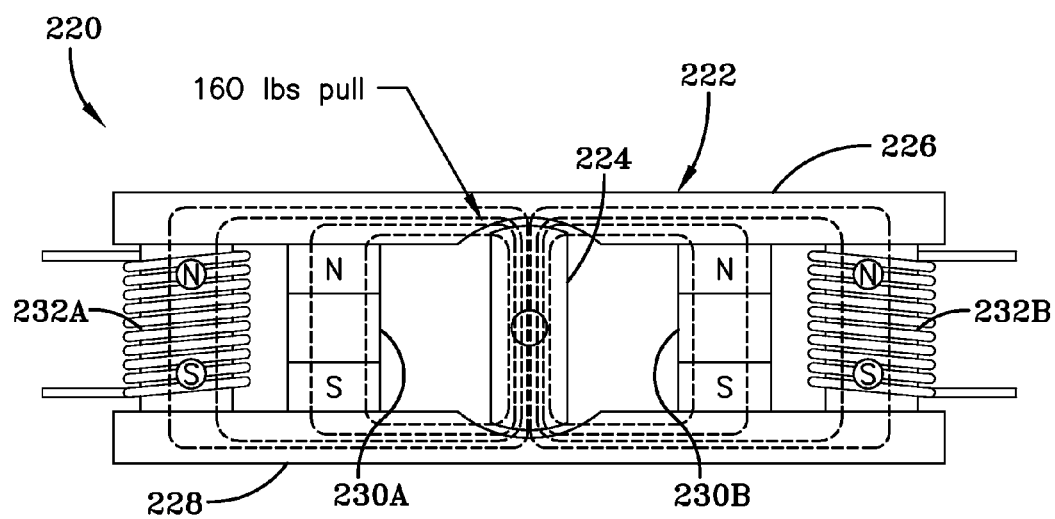
FIG. 15B is a schematic, cross-sectional view of the motor of FIG. 15A with the magnetic field directed through the rotor.

Another embodiment of a motor is illustrated in FIGS. 15A and 15B. In this example, electromagnets are provided for controlling the magnetic pull on a rotor. Similar to the previous embodiment, the motor 220 is comprised of valve 222 and rotor 224. Valve 222 includes two sets of magnets that are positioned between field poles 226 and 228. A first set of magnets is comprised of magnet 230A and electromagnet 232A, and a second set of magnets is comprised of magnet 230B and electromagnet 232B. In FIG. 15A, the respective coils of electromagnets 232A and 232B are not shown in order to more clearly illustrate the operation of motor 220. When current is not supplied to electromagnets 232A and 232B, the magnetic pull of magnet 230A is directed through the core of electromagnet 232A, and the magnetic pull of magnet 230B is directed through the core of electromagnet 232B. As a result, there is substantially no magnetic pull on rotor 224 when current is not supplied to electromagnets 232A and 232B. However, when current is supplied to electromagnets 232A and 232B such as shown in FIG. 15B, the magnetic field of each set of magnets is directed through rotor 224. Assuming that each magnet is individually capable of producing 20 lbs. of magnetic pull in this example, the resulting magnetic pull on rotor 224 is 160 lbs. Consequently, rotor 224 may be caused to rotate by intermittently supplying current to electromagnets 232A and 232B.

Figure 16A:
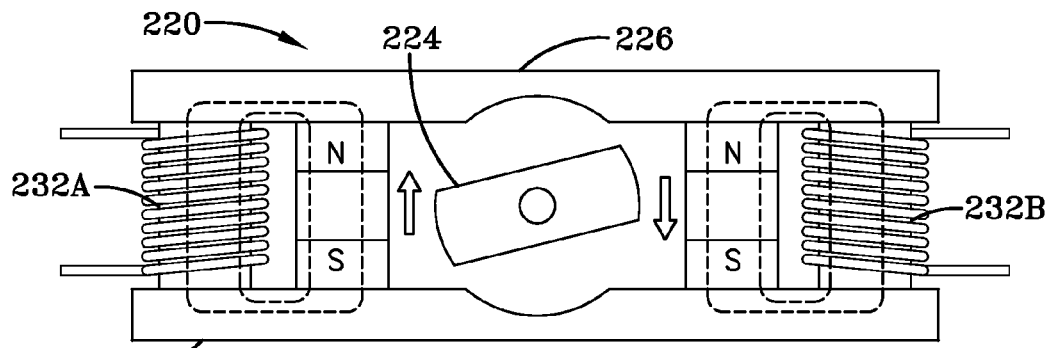
FIGS. 16A through 16D are schematic, cross-sectional views of the motor of FIG. 15A, wherein the rotation of the rotor is illustrated.
Figure 16B:
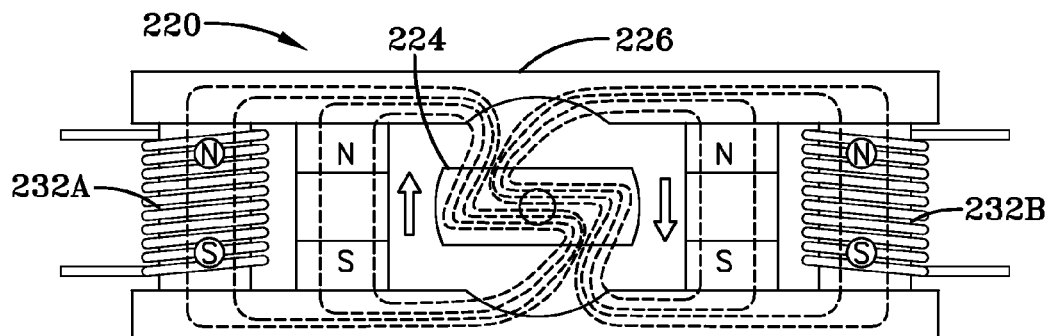
Figure 16C:
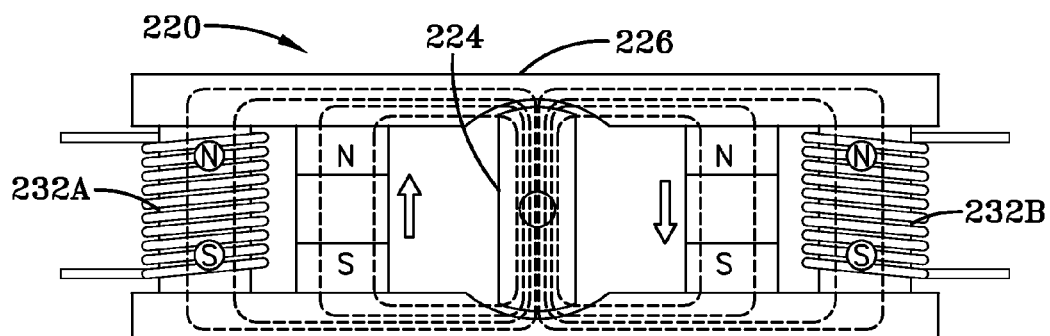
Figure 16D:
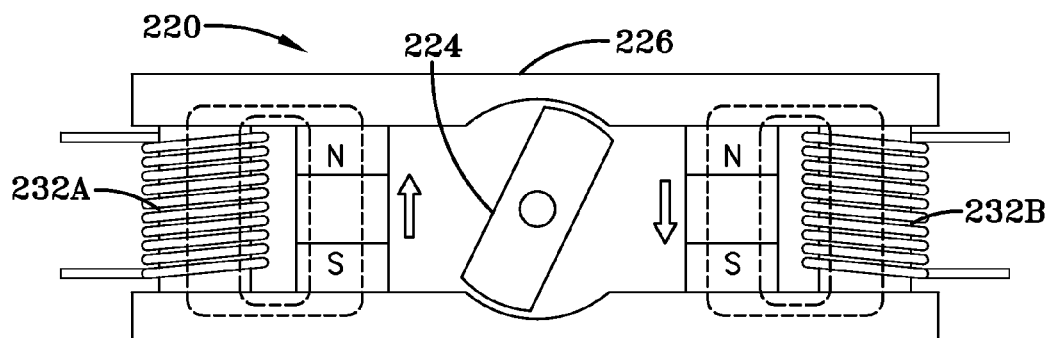

An exemplary method of operation of motor 220 will now be described in more detail with regard to FIGS. 16A through 16D. In FIG. 16A, there is no current being supplied to electromagnets 232A and 232B, and rotor 224 is rotating in a clockwise direction. Approximately when rotor 224 becomes horizontally situated between field poles 226 and 228 such as shown in FIG. 16B, current is supplied to electromagnets 232A and 232B. In this example, this creates 160 lbs. of magnetic pull on rotor 224, which sustains the clockwise rotation. Approximately when rotor 224 reaches a vertical position between field poles 226 and 228 (such as shown in FIG. 16C), the current to electromagnets 232A and 232B may be turned off. The momentum of the rotor causes it to continue rotating in a clockwise direction as shown in FIG. 16D. Approximately when the rotor reaches a horizontal position between field poles 226 and 228, the current may again be applied to electromagnets 232A and 232B (such as shown in FIG. 16B) and the process may be repeated. In this manner, the intermittent magnetic pull may sustain the rotation of rotor 224.

Many variations of the motor and its method of operation are possible and within the scope of the present invention. All of the variations are too numerous to identify. Some of those variations will be identified below. Using the specification of the present invention, it will be recognized that other variations are also included within the scope of the present invention.

Each of the above examples show a motor comprised of a valve including two sets of magnets. In some other embodiments of the present invention, a valve may be comprised of a single set of magnets. In such an embodiment, the method of operation may be similar; however, there may be less magnetic pull on the rotor. It should also be recognized that some embodiments of the motor may include a valve comprised of more than two sets of magnets. For instance, some exemplary embodiments may include three or more sets of magnets.

Furthermore, some exemplary embodiments of a motor may include multiple sets of field poles. In other words, an exemplary embodiment of a motor of the present invention may include multiple valves, wherein each valve comprises a respective set of field poles. In such examples, each valve may include at least one set of magnets.

Each of the above illustrated examples of a motor show a rotor situated between two sets of magnets. However, in other embodiments of the present invention, more than one set of magnets may be positioned along one side of the rotor. In such embodiments, the sets of magnets along one side of the rotor may utilize the same field poles or different field poles (i.e., the sets of magnets may be from the same valve or different valves).

Furthermore, some exemplary embodiments of a motor of the present invention may include more than one rotor. In fact, it should be recognized that an exemplary embodiment of a motor may include any desired combination of valves and rotors. Some possible combinations include, but are not limited to: a single valve and a single rotor; a single valve and multiple rotors; multiple valves and a single rotor; and multiple valves and multiple rotors. The desired combination of valves and rotors may be selected to achieve the desired operational characteristics for the motor including, but not limited to, torque, horsepower, revolutions per minute (i.e., RPM), or other operational characteristics.

Figure 17:
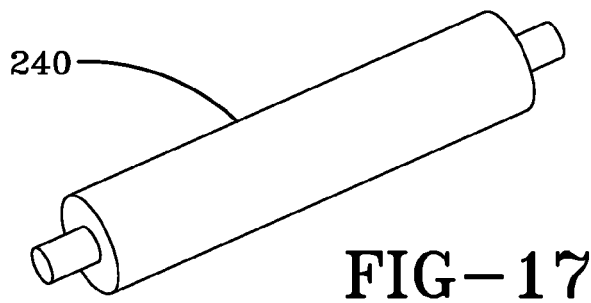
FIG. 17 is a side elevation view of an exemplary embodiment of a rotor.
Figure 18:
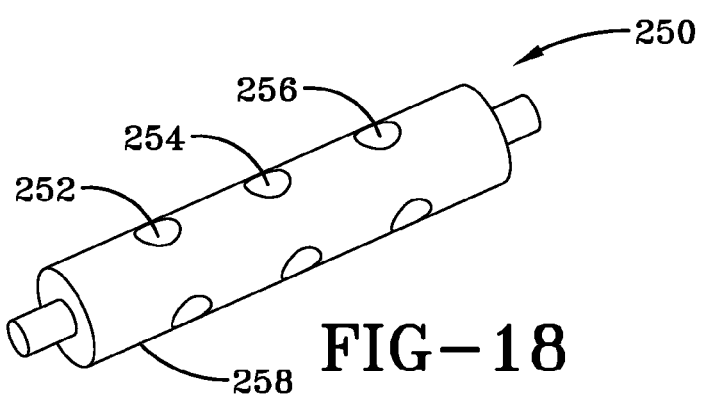
FIG. 18 is a perspective view of a second exemplary embodiment of a rotor, wherein the poles of the rotor are aligned.
Figure 19:
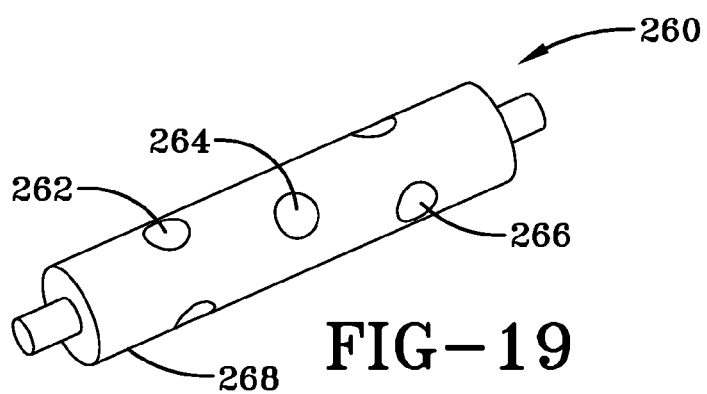
FIG. 19 is a perspective view of a third exemplary embodiment of a rotor, wherein adjacent poles of the rotor are offset by approximately 60 degrees.
Figure 20:
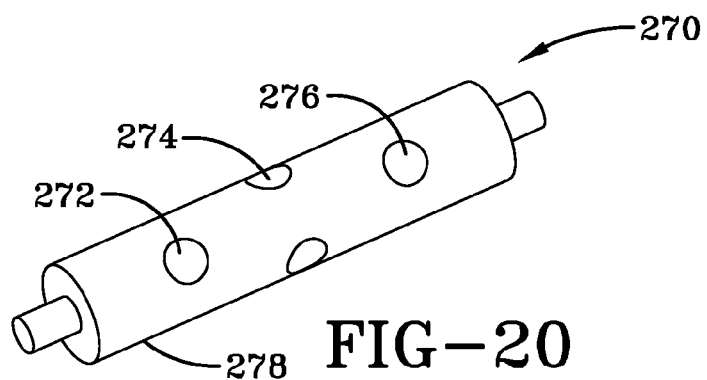
FIG. 20 is a perspective view of a fourth exemplary embodiment of a rotor, wherein adjacent poles of the rotor are offset by approximately 90 degrees.

A rotor may have any desired shape and dimensions to suit a particular application. A number of factors that may be considered in selecting the shape and dimensions of a rotor include, but are not limited to: the number of valves; the number of sets of magnets; the number of sets of field poles; the number of rotors; the proximity and design of the other components of the motor; the desired magnetic pull on the rotor; the characteristics of the applicable magnetic field; and the rotation of the rotor. FIG. 17 shows an example of an elongate rotor 240. On the other hand, FIG. 18 shows an example of a multiple pole rotor 250. In this example, rotor 250 is comprised of poles 252, 254, and 256, which are made of magnetic material. The poles 252, 254, and 256 may be mounted in or otherwise secured to a shaft 258, which may be made of non-magnetic material (e.g., aluminum). It should be recognized that poles 252, 254, and 256 may also be referred to as rotors, in which case FIG. 18 depicts a multiple rotor system. In FIG. 18, poles (i.e., rotors) 252, 254, and 256 are aligned with each other. In other embodiments, the poles (i.e., rotors) may not be aligned. For example, FIG. 19 illustrates an example of a multiple pole rotor 260 in which poles 262, 264, and 266 are offset from each other. In this example, adjacent poles are offset by approximately 60 degrees. Nevertheless, it should be recognized that any desired amount of offset may be selected. Optionally, poles 262, 264, and 266 may be mounted in or otherwise secured to a shaft 268. Such an embodiment may allow substantially constant pull on rotor 260 via poles 262, 264, and 266, if desired. For example, at least one valve may be used to successively apply magnetic pull on poles 262, 264, and 266. If desired, there may be some overlap in which there is magnetic pull on more than one pole at the same time. As a result, this exemplary embodiment may allow rotor 260 to rotate substantially without any coasting time, if desired. Another example of a multiple pole rotor 270 is shown in FIG. 20. In this exemplary embodiment, poles 272, 274, and 276 are mounted in shaft 278, and adjacent poles are offset by approximately 90 degrees. This is another example that may enable substantially constant pull on rotor 270, if desired. By using a multiple pole rotor (i.e., multiple rotors) and supplying substantially constant magnetic pull, the inventor has discovered that the horsepower output of the motor may be improved; nevertheless, it should be recognized that numerous other factors also affect the horsepower output of the motor. Other variations of a multiple pole rotor are possible. For example, although FIGS. 18-20 show embodiments in which the poles are connected by a common shaft, it should be recognized that the rotors of a multiple rotor system may be disconnected in some exemplary embodiments of the present invention.

The method of operation of the motor may be selected in order to achieve desired performance. For instance, the initial rotation of a rotor may be achieved in any suitable manner. For example, the rotor may be positioned such that the initial magnetic pull on the rotor is sufficient to initiate rotation (i.e., self-starting). If desired, other manual or automatic means may be used to initiate rotation of the rotor. For example, rotation of the rotor may be activated by hand, or a suitable mechanical or electromechanical system may be used to start the rotation.

Regardless of the method used to initiate the rotation of the rotor, the timing of the valve(s) (i.e., the rotation of a permanent magnet or the application of current to an electromagnet) may be selected to sustain the rotation and achieve the desired output characteristics. For example, the timing of the valve(s) may be selected to obtain the desired duration and sequence of magnetic pull on a rotor in order to suit a particular application. In some exemplary embodiments of the present invention, the timing of the valve(s) may be selected to optimize or maximize the rotational speed of the rotor. In other exemplary embodiments of the present invention, the timing of the valve (s) may be selected to optimize or maximize the torque, horsepower, or other operational characteristics of the motor. Other criteria may also be used to select the timing of the valves. Accordingly, unless expressly stated otherwise, it is not intended to limit the present invention to any particular timing of the valve(s).

Figure 21:
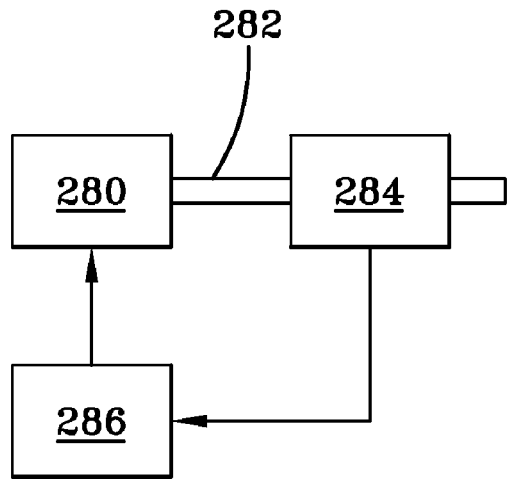
FIG. 21 is a schematic view of an exemplary embodiment of a closed loop control system.
Figure 22:
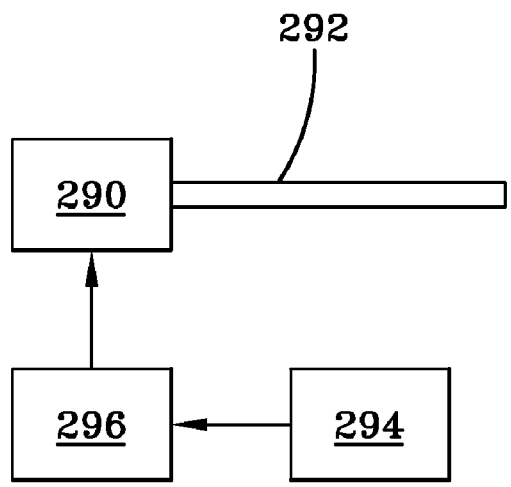
FIG. 22 is a schematic view of an exemplary embodiment of an open loop control system.

Any suitable system and method may be used in order to obtain the desired timing of the valves. For instance, a mechanical, electrical, or electromechanical system may be used to control the timing of the valve(s). Examples of systems for controlling the timing include, but are not limited to: a cam system in communication with a rotor and valve; a brush and commutator system in communication with a rotor and valve; a limit switch system in communication with a rotor and valve; a servo system in communication with a rotor and a valve; a software-based and/or hardware-based electrical control circuit in communication with a valve and optionally a rotor (e.g., an open loop or closed loop control system); other types of mechanical, electromechanical, or electronic switching systems that are timed according to rotor rotation; and other similar or suitable mechanical, electrical, electromechanical, hardware, and/or software systems for controlling the timing of a motor including, but not limited to, other control systems for controlling the operation of conventional motors. FIG. 21 shows an example of a closed loop control system that controls the operation of a motor 280 using feedback from a rotor 282. In this exemplary embodiment, the control system is comprised of a shaft encoder 284 and an optional driver circuit 286. In particular, the shaft encoder 284 provides feedback from rotor 282 that driver circuit 286 uses to control motor 280. FIG. 22, on the other hand, illustrates an example of an open loop control system for controlling motor 290. In this example, there is no feedback from the rotor 292. The control system of this exemplary embodiment is comprised of a translator circuit and/or a control model program 294 and an optional driver circuit 296. For example, this exemplary embodiment may enable complete software control.

A motor of the present invention may be used for any suitable purpose. For example, motors of the present invention may be used for tools, appliances, vehicles, toys, and other various types of machines and equipment. In fact, all of the potential uses of a motor of the present invention are too numerous to identify. Nevertheless, it should be recognized that exemplary embodiments of the present invention may be substituted for any type of conventional motor. Exemplary embodiments of the present invention may also be used for any other application that may benefit from the use of the motor, regardless of whether conventional motors are currently used for such applications.

A motor of the present invention may offer one or more surprising advantages. For instance, some exemplary embodiments of a motor may be significantly more efficient than a conventional DC motor. For example, some exemplary embodiments of a motor may be at least 90% efficient. In fact, testing of exemplary embodiments of the motor is ongoing, and preliminary tests indicate that some exemplary embodiments of the present invention may have an output/input ratio that approaches or even exceeds unity. In addition, some exemplary embodiments of a motor of the present invention may use less power than conventional DC motors in order to create the same rotor pull. Also, in some exemplary embodiments of the motor, the rotor movement may have much less effect on current drain as compared to conventional DC motors. For example, some exemplary embodiments of the motor may use approximately or substantially constant current at any rotor speed or pull down state (e.g., a change in the load on a rotor may only cause a relatively small variation in current draw as compared to conventional DC motors). Consequently, some exemplary embodiments of the motor may draw approximately or substantially constant current if the rotation of the rotor is inhibited or even halted by an additional load.

In light of the above examples, it should be recognized that a valve of the present invention is not limited to any particular use. One example of use is as a holding/lifting device. The valve may also be used for generating rotational motion as in a motor or linear motion such as in a solenoid. Also, the load may be comprised of a core of magnetic material and a coil of electrically conductive material. As a result, by switching the magnetic field generated by the valve of the present invention, electricity may be generated through the load coil. In other words, a valve of the present invention may be used to make a very efficient generator. Other uses of the valve are possible and included within the scope of the present invention.

EXAMPLES

The inventor made a valve comprising a permanent magnet and an electromagnet such as shown in FIGS. 6 and 7. The permanent magnet was individually capable of creating 70 lbs. of magnetic pull. In the first test, 8 watts of power (i.e., 5 volts DC at 1.6 amps) was supplied to the electromagnet, thereby making the electromagnetic also individually capable of creating 70 lbs. of magnetic pull. In other words, the energy force of the two magnets was substantially equal. When the power was supplied to the electromagnet, the combined magnetic field of the permanent magnet and the electromagnet produced 280 lbs. of lifting force on a load. In a second test, 19.2 watts of power was supplied to the electromagnet. As a result, the magnets were not evenly matched, and the valve was less efficient. Regardless, the valve still produced 350 lbs. of lifting force on a load.

In a third test, the inventor used two valves situated adjacent to each other. The power supplied to each valve was 8 watts (i.e., 5 volts DC at 1.6 amps). As a result, the total power used was 16 watts. Nevertheless, the valves created 560 lbs. of lifting force on a load.

In a fourth test, the inventor tested a valve similar to the one shown in FIGS. 4 and 5. Each permanent magnet was individually capable of creating 20 lbs. of lifting force. By rotating one of the magnets, the combined magnetic field of the magnets produced about 80 lbs. of lifting force. Moreover, only about 5 lbs. of force was required to use a one-inch lever to rotate the magnet again in order to remove the magnetic field from the load.

Figure 23:
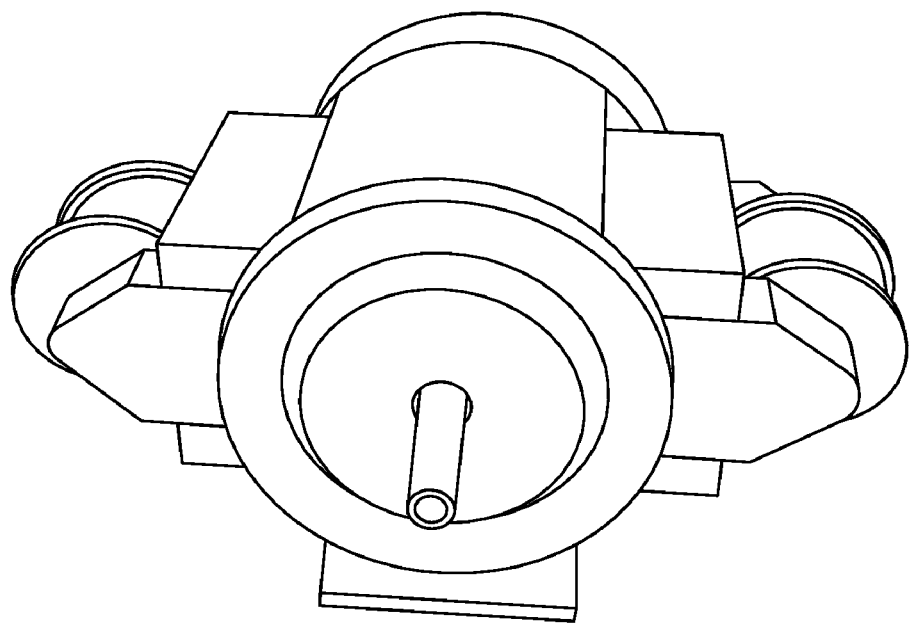
FIG. 23 is a perspective view of a third exemplary embodiment of a motor of the present invention.

The inventor has also tested multiple embodiments of a motor of the present invention. For a fifth test, the inventor tested a motor having a configuration similar to that shown in FIGS. 15A and 15B. The motor is shown in FIG. 23. With an input voltage of 18 volts DC, the current draw was approximately 1 amp, and the free running rotor speed was approximately 1,500 RPM. The same motor was also tested under load at 2,000 RPM. The input was 0.5 amp at 48 volts DC (i.e., 24 watts). The torque/horsepower output was tested using a Prony brake. The lever was 12 inches, and a digital scale was used for foot-pounds measurement. The output was 1.5 oz (i.e., 0.036 hp or 26.6 watts). Thus, the test results showed that the motor was exceptionally efficient.

Figure 24:
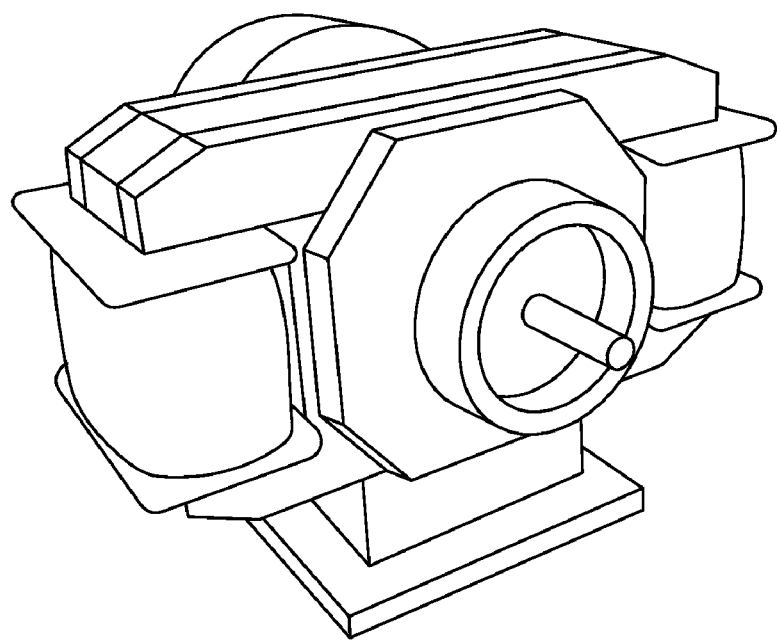
FIG. 24 is a perspective view of a fourth exemplary embodiment of a motor of the present invention.

In a sixth test, the inventor tested the motor shown in FIG. 24, which also has a configuration similar to that shown in FIGS. 15A and 15B. There was magnetic pull on the rotor for approximately ½ of a cycle. While free running with an input of 0.2 amp at 36 volts DC, the rotor speed was approximately over 5,000 RPM. This exemplary embodiment also exhibited minimal current fluctuation when loaded down. In particular, when loaded down to 50 RPM, the current was still under 1 amp, which is only a 0.8 amp change from a free running to a nearly stalled rotor. The motor output was also tested under load. With the rotor under load and running at 2,000 RPM, the input was 0.4 amp at 36 volts DC (i.e., 14.4 watts). Using a Prony brake, the output was 0.05625 lbs. at 1 foot from the shaft with the motor pulled down to 2,000 RPM. In other words, the output was 0.9 oz. at one foot, which is equivalent to 0.021 hp or 15.9 watts. Again, this embodiment of the motor was surprisingly efficient.

Figure 25:
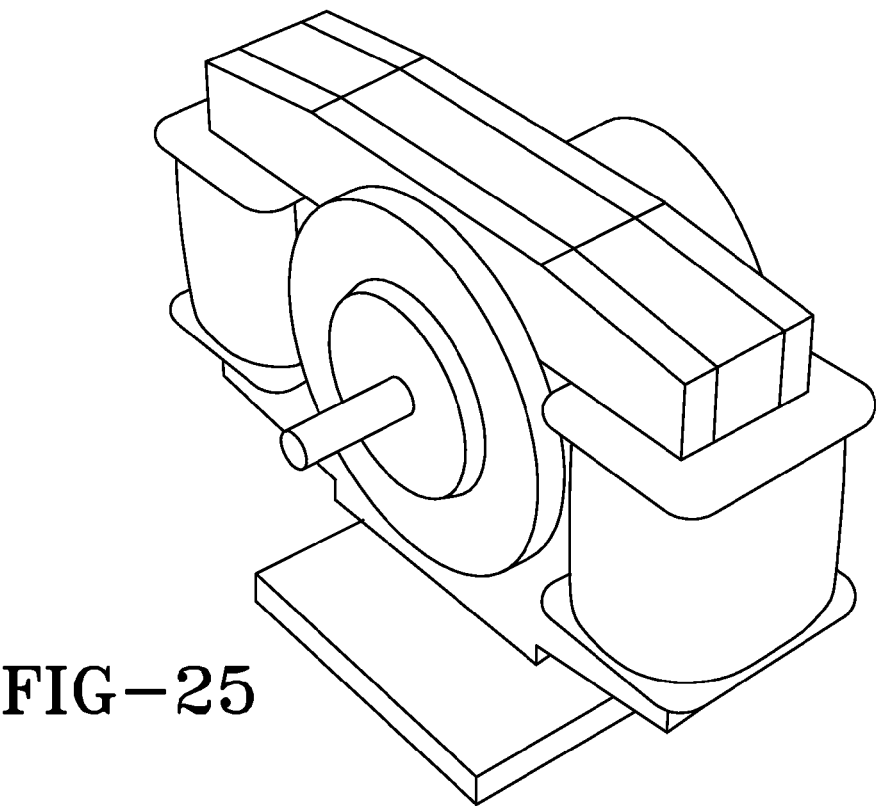
FIG. 25 is a perspective view of a fifth exemplary embodiment of a motor of the present invention.
Figure 26:
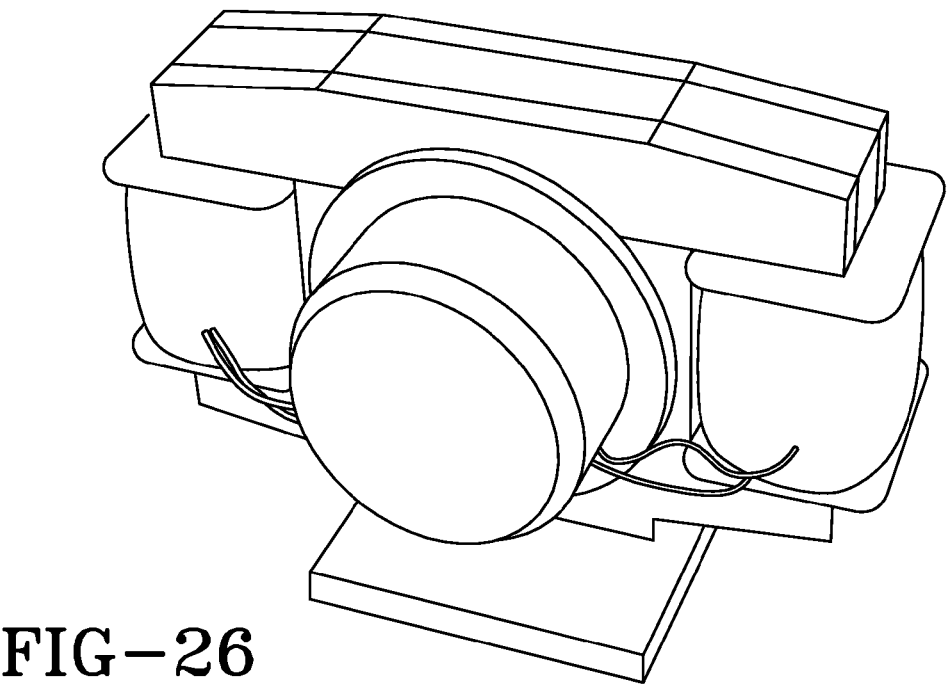
FIG. 26 is another perspective view of the motor of FIG. 25.

For a seventh test, the inventor tested the motor shown in FIGS. 25 and 26. This is another example of a motor comprised of only one set of field poles (i.e., one valve). This motor produced a little more than ⅛ hp at around 4,000 RPM under load. Unloaded, it turned around 5,500 RPM on 45 volts DC and 0.9 amp.

Figure 27:
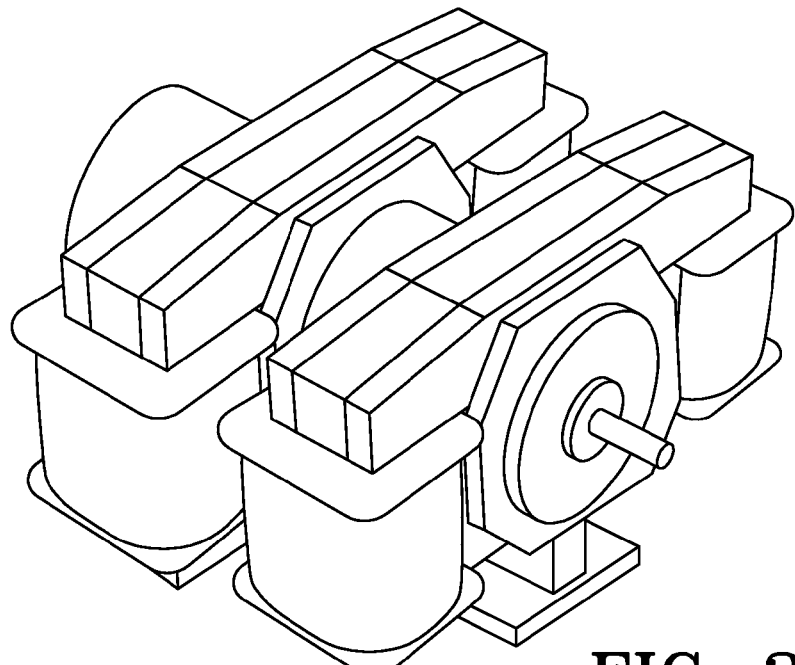
FIG. 27 is a perspective view of a sixth exemplary embodiment of a motor of the present invention.

FIG. 27 shows an eighth test embodiment of the present invention. In this example, the motor is comprised of two valves, wherein each valve includes two sets of magnets situated between a pair of field poles. This may also be referred to as a four-valve system since there are four sets of magnets. With reference to a two-valve system, a rotor extends between the two sets of magnets of each valve. In this exemplary embodiment, the rotor has two poles (i.e., a two-rotor system), wherein each pole is associated with one of the valves such as shown in FIGS. 15A and 15B. The poles of the rotor are offset by about 90 degrees. As a result, this embodiment may create substantially constant magnetic pull on the rotor.

Figure 28:
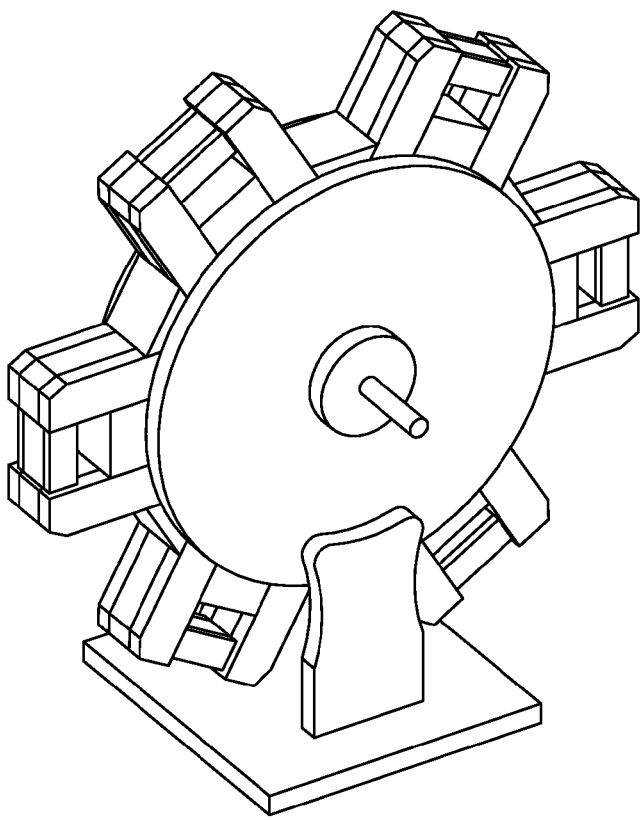
FIG. 28 is a perspective view of a seventh exemplary embodiment of a motor of the present invention.

A radial design of a motor is shown in FIG. 28. In this test embodiment, the motor is comprised six valves. Each valve is comprised of a set of magnets situated between a pair of field poles. In this exemplary embodiment, adjacent valves are offset by about 60 degrees. A single rotor is rotated by the valves. Opposing valves intermittently supply magnetic pull on the rotor. However, if desired, it should be recognized that the motor may also be controlled such that each valve individually and intermittently supplies magnetic pull on the rotor. Again, this is another exemplary embodiment that may create substantially constant magnetic pull on the rotor.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A motor comprising:
   a valve comprising:
      (a) field poles;
      (b) a first magnet in magnetic communication with said field poles such that said first magnet extends between said field poles; and
      (c) a second magnet in magnetic communication with said field poles such that said second magnet extends between said field poles, said second magnet being an electromagnet such that a magnetic field of said second magnet is adapted to be controlled by current to said second magnet; and
   a rotor rotatable situated between said field poles such that one of said first and second magnets is situated between said rotor and another one of said first and second magnets relative to said field poles, said rotor comprised of magnetic material substantially independent of a permanent magnet and an electromagnet;
   wherein said rotor is adapted to be rotated by controlling current to said second magnet.

2. The motor of claim 1 wherein each of said field poles is comprised of material that is adapted not to magnetically saturate when subjected to a magnetic field generated by said magnets.

3. The motor of claim 1 wherein said first magnet is a permanent magnet.

4. The motor of claim 1 wherein said first magnet is comprised of rare earth material.

5. The motor of claim 1 wherein said first magnet and said second magnet are substantially evenly matched.

6. The motor of claim 1 wherein current is direct current.

7. The motor of claim 1 wherein a magnetic field generated by said magnets is adapted to be applied to and substantially removed from said rotor by controlling current to said second magnet in order to induce rotation of said rotor.

8. The motor of claim 1 wherein a magnetic field associated with said magnets is adapted to pull said rotor multiple times per revolution.

9. The motor of claim 1 wherein said rotor is adapted to rotate toward said magnets.

10. The motor of claim 1 wherein:
   a magnetic field of said first and second magnets is adapted to be intermittently applied to said rotor by controlling current to said second magnet; and
   a pull of said magnetic field of said first and second magnets is adapted to be substantially four times an individual pull of one of said first and second magnets.

11. A motor comprising:
   a valve comprising:

(a) field poles;
(b) a first and second set of magnets, each set of magnets comprising:
   (i) a first magnet in magnetic communication with said field poles such that said first magnet extends between said field poles; and
   (ii) a second magnet in magnetic communication with said field poles such that said second magnet extends between said field poles, said second magnet being an electromagnet such that a magnetic field of said second magnet is adapted to be controlled by current to said second magnet; and
a rotor rotatably situated between said field poles such that with respect to each set of magnets one of said first and second magnets is situated between said rotor and another one of said first and second magnets relative to said field poles, said rotor comprised of magnetic material substantially independent of a permanent magnet and an electromagnet;
wherein said rotor is adapted to be rotated by controlling current to said second magnet of each set of magnets.

12. The motor of claim 11 wherein each of said field poles is comprised of material that is adapted not to magnetically saturate when subjected to a magnetic field generated by said magnets.

13. The motor of claim 11 wherein said first magnet of each set of magnets is a permanent magnet.

14. The motor of claim 11 wherein said first magnet of each set of magnets is comprised of rare earth material.

15. The motor of claim 11 wherein said first magnet and said second magnet of each set of magnets are substantially evenly matched.

16. The motor of claim 11 wherein current is direct current.

17. The motor of claim 11 wherein a magnetic field generated by said magnets is adapted to be applied to and substantially removed from said rotor by controlling current to said second magnet of each set of magnets in order to induce rotation of said rotor.

18. The motor of claim 11 further comprising another valve such that said rotor is adapted to be rotated by controlling current to said valves.

19. The motor of claim 11 wherein a magnetic field associated with each set of magnets is adapted to pull said rotor multiple times per revolution.

20. The motor of claim 11 wherein said rotor is adapted to rotate toward each set of magnets.

21. The motor of claim 11 wherein:
a respective magnetic field of said first and second magnets of each set of magnets is adapted to be intermittently applied to said rotor by controlling current to said second magnet of each set of magnets; and
a respective pull of said magnetic field of said first and second magnets of each set of magnets is adapted to be substantially four times a respective individual pull of one of said first and second magnets of each set of magnets.

22. A method for producing energy, said method comprising:
providing a rotor rotatably situated between field poles, said rotor comprised of magnetic material substantially independent of a permanent magnet and an electromagnet;
providing a first magnet and a second magnet that each extend between said field poles such that said first and second magnets are in magnetic communication wherein one of said first and second magnets is situated between said rotor and another one of said first and second magnets relative to said field poles, said second magnet being an electromagnet; and
intermittently switching a magnetic field of said magnets by controlling current to said second magnet such that said magnetic field intermittently passes through said rotor;
wherein said rotor rotates.

23. The method of claim 22 further comprising:
providing a third magnet and a fourth magnet that each extend between said field poles such that said third and fourth magnets are in magnetic communication wherein one of said third and fourth magnets is situated between said rotor and another one of said third and fourth magnets relative to said field poles, said fourth magnet being an electromagnet; and
intermittently switching a magnetic field of said third magnet and said fourth magnet by controlling current to said fourth magnet such that said magnetic field of said third magnet and said fourth magnet intermittently passes through said rotor.

24. The method of claim 22 wherein said magnetic field intermittently passes through said rotor multiple times per revolution.

25. The method of claim 22 wherein said rotor rotates toward said magnets.

26. The method of claim 22 wherein said rotor rotates substantially without being repulsed by said magnetic field of said magnets.

27. The method of claim 22 wherein a pull of said magnetic field of said first and second magnets is adapted to be substantially four times an individual pull of one of said first and second magnets.

* * * * *